June 13, 1950

F. J. REITER 2,511,649

LIQUID LEVEL GAUGE

Filed March 1, 1948

Frank J. Reiter
INVENTOR.

BY

June 13, 1950  F. J. REITER  2,511,649
LIQUID LEVEL GAUGE
Filed March 1, 1948  2 Sheets-Sheet 2
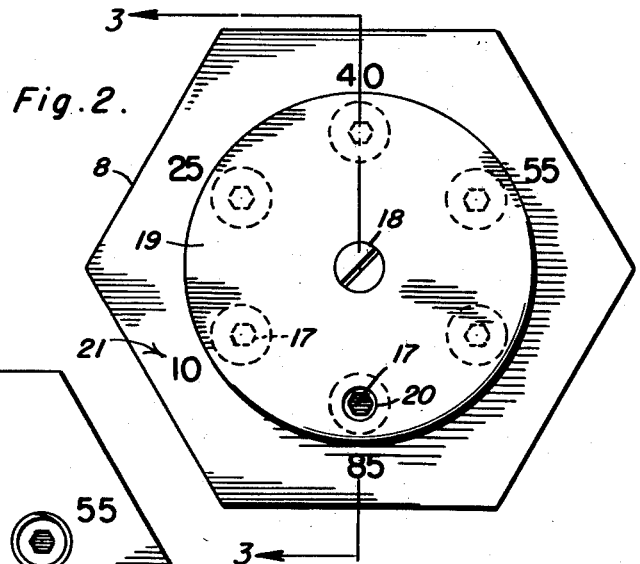
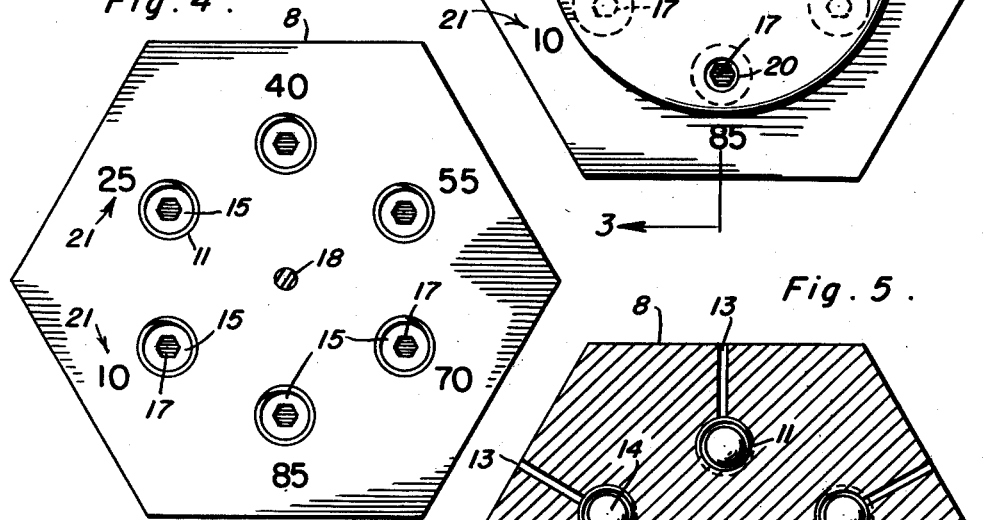
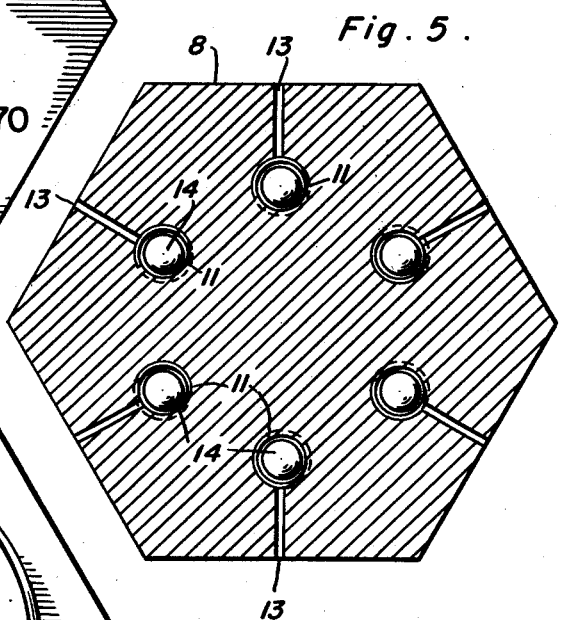
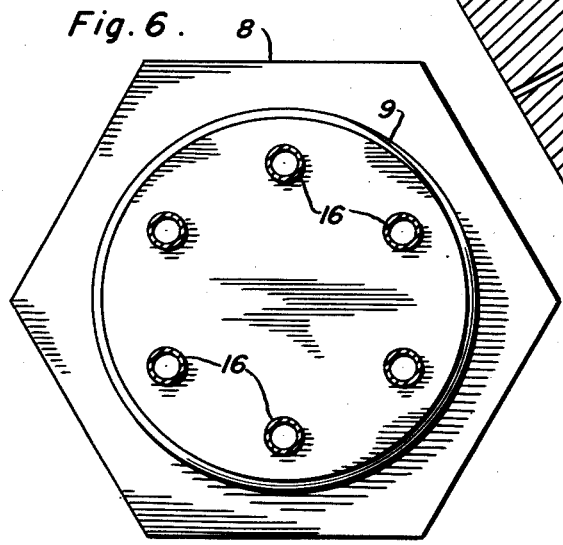
Frank J. Reiter
INVENTOR Patented June 13, 1950

2,511,649

UNITED STATES PATENT OFFICE 2,511,649

LIQUID LEVEL GAUGE

Frank J. Reiter, Jefferson City, Mo.

Application March 1, 1948, Serial No. 12,461

4 Claims. (Cl. 73—297)

This invention relates to a gauge for use in connection with a tank in which a liquid is stored under pressure, for the purpose of enabling a person to readily determine the approximate level of the liquid in the tank at any time.

An object of the invention is to provide an improved gauge for the above purpose and of the type embodying a control head adapted to be secured in an opening provided in the top of the tank and having a plurality of depending gauge tubes of different lengths, each having individual valve control.

Another object is to provide the control head with individual control valves for the gauge tubes which are arranged to facilitate ready access to and selective operation of the same.

A further object is to provide novel means to prevent accidental removal and loss of the control valves.

Still another object is to provide a gauge of the above kind which is simple and durable in construction, easy to install and use, and efficient in operation.

The exact nature of the present invention will become apparent from the following description when considered in connection with the accompanying drawings, in which:

Figure 2 is an enlarged top plan view of the gauge;

Figure 1:
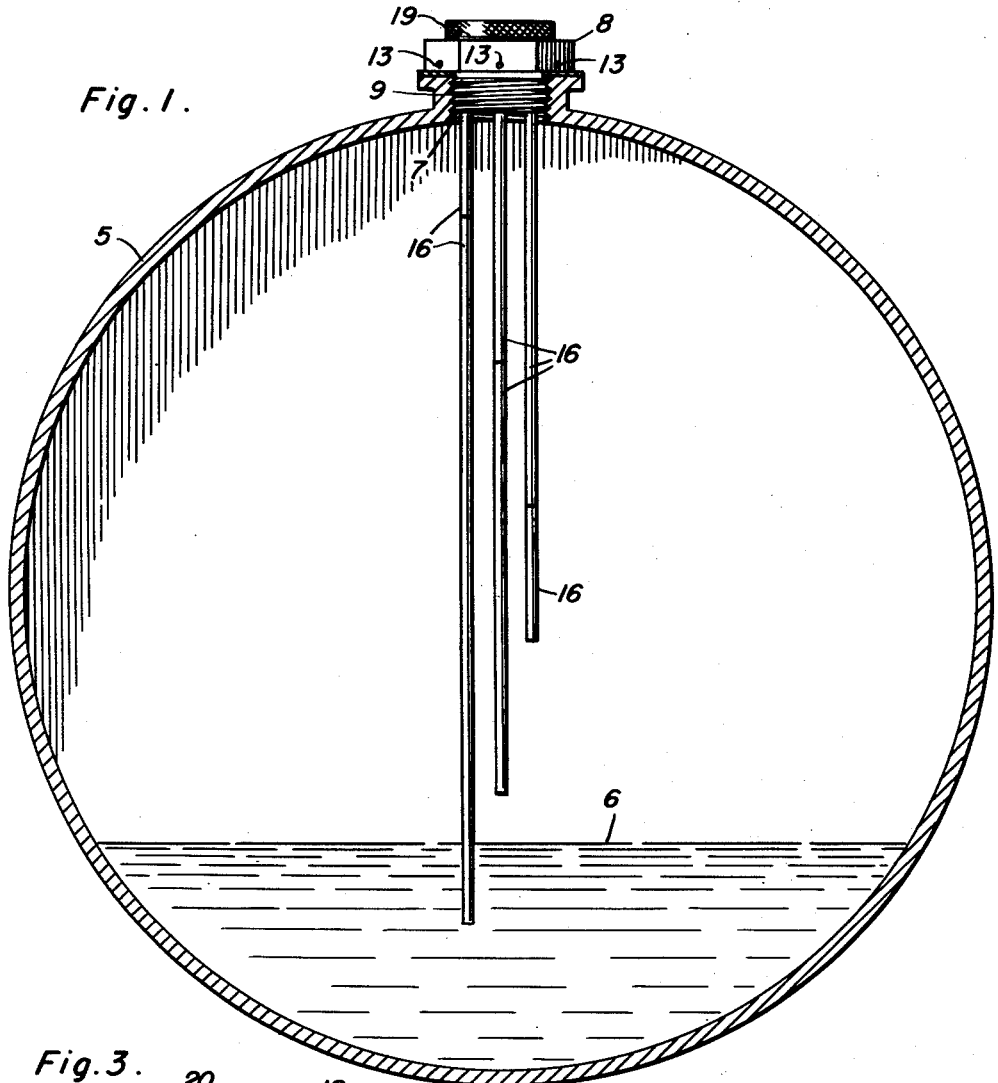
Figure 1 is a vertical sectional view of a tank equipped with a gauge embodying the present invention.
Figure 3:
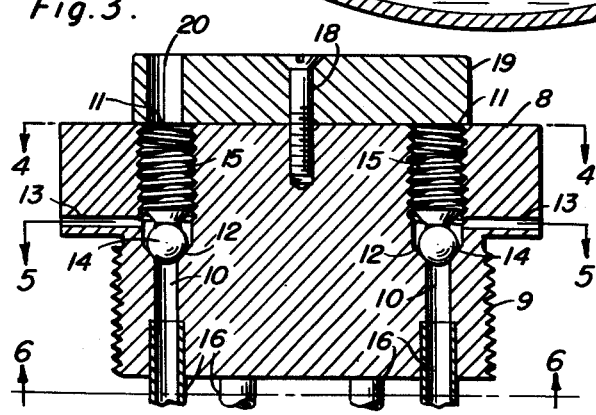

Figure 3 is a fragmentary vertical section taken on the line 3—3 of Figure 2; and Figures 4, 5 and 6 are horizontal sectional views taken respectively on the lines 4—4, 5—5 and 6—6 of Figure 3.

Referring in detail to the drawings, 5 indicates a tank having liquid 6 stored therein under pressure and provided at the top with an opening 7.

The present gauge includes a control head 8 having an externally reduced lower portion 9 threaded or otherwise secured in the tank opening 7 and provided with a circular or arcuate series of uniformly spaced vertical passages 10 therethrough. The upper portion 11 of each passage 10 is enlarged or counter-bored to provide a valve seat 12 at the bottom of said enlarged passage portion, and bleed holes 13 are provided in the upper portion of head 8 so that one of the same extends outwardly from the enlarged upper portion 11 of each passage 10 through the adjacent side of the head. A valve is provided to control the flow of gas or liquid from each passage 10 to the associated bleed hole 13, said valve preferably embodying a ball valve member 14 adapted to engage the seat 12 of said passage, and a threaded stem 15 screwed and entirely located within the enlarged upper portion 11 of the passage 10 above the valve member 14 therein, for use in tightly forcing and holding the latter closed or down on its seat. A plurality of gauge tubes 16, varying in length by a predetermined amount, are attached at their upper ends to the bottom of the control head so that the upper end of each tube communicates with the lower end of a different one of the passages 10. Each stem 15 is adapted for driving engagement of a key or handle with the upper end thereof, and for this purpose may have a polygonal socket 17 therein.

Swivelled at 18 on the top of head 8 is a circular knob or disc 19 which marginally covers the upper ends of passages 10 to exclude rain and the like therefrom. This knob or disc has an opening 20 near its periphery which is adapted, by turning said knob or disc, to be aligned with any desired one of the passages 10 so that the key or handle may be passed through said opening 20 and engaged with the stem 15 in the aligned passage 10 for turning said stem. The opening 20 is of smaller diameter than the stem 15 to prevent the latter from being threaded upwardly out of the head and being lost. Indicia 21 may be suitably provided on top of the head adjacent the respective stems 15 to indicate what percent of the tank contains liquid when the level of the latter is at the lower end of the gauge tube associated with any particular one of said stems.

In use, the valves in the control head are successively opened until adjoining valves are discovered, one of which allows gas to escape, and the other of which allows liquid to escape. As illustrated, this would be the valves having the indicia "10" and "25" adjacent thereto, thereby indicating that the tank is between 10 and 25 percent full. Naturally, when any stem 15 is threaded upwardly to disengage from the associated valve member 14, the latter will be forced upwardly to open position by the pressure in the tank.

From the foregoing description, it is believed that the construction, operation and advantages of the present invention will be readily understood and appreciated by those skilled in the art. Modifications and minor changes in details of construction are contemplated, such as fairly fall within the spirit and scope of the invention as claimed.

What I claim as new is:

1. A tank gauging device comprising a control head adapted to be secured in an opening provided in the top of a tank and provided with an arcuate series of spaced non-communicating vertical passages which extend entirely therethrough, said control head further having a horizontal valve seat in each passage and a lateral bleed hole leading outwardly from each passage above its valve seat through the adjacent side of the head, a vertically movable valve in the upper portion of each passage manually operable from the top of said control head and coacting with the seat in said passage to control the flow of gas or liquid to the associated bleed hole, and a plurality of gauge tubes of different lengths attached at their upper ends to and depending different distances from said control head, each tube being in communication with the lower end of a different one of said vertical passages.

2. The construction defined in claim 1, wherein the upper portion of each passage is counterbored, each valve including a stem adjustably threaded and wholly disposed within the upper portion of one of said vertical passages and adapted for driving engagement of a key with the upper end thereof.

3. The construction defined in claim 1, wherein the upper portion of each passage is counterbored, each valve including a stem adjustably threaded and wholly disposed within the upper portion of one of said vertical passages and adapted for driving engagement of a key with the upper end thereof, and a disc swivelled on top of the head and marginally covering said vertical passages, said disc having an opening selectively registerable with any desired one of said passages by turning the disc to allow engagement of the key with the valve stem in said passage.

4. The construction defined in claim 1, in combination with indicia on the top of the control head adjacent each passage.

FRANK J. REITER.

REFERENCES CITED

The following references are of record in the file of this patent:

UNITED STATES PATENTS

| Number | Name | Date |
| --- | --- | --- |
| 368,441 | Baker | Aug. 16, 1887 |
| 1,521,668 | Bond | Jan. 6, 1925 |
| 2,090,514 | Folmsbee | Aug. 17, 1937 |

FOREIGN PATENTS

| Number | Country | Date |
| --- | --- | --- |
| 304,001 | Germany | Jan. 18, 1917 |